United States Patent [19]

Kumasaka et al.

[11] Patent Number: 4,656,547
[45] Date of Patent: Apr. 7, 1987

[54] COMPOSITE TYPE MAGNETIC HEAD FOR RECORDING AND REPRODUCING HIGH FREQUENCY SIGNALS

[75] Inventors: Noriyuki Kumasaka, Ome; Hideo Fujiwara, Tokorozawa; Shigekazu Otomo, Sayama; Takeo Yamashita, Hachioji; Shinji Takayama, Mitaka; Noritoshi Saito, Hachioji; Mitsuhiro Kudo, Tokyo, all of Japan

[73] Assignee: Hitachi, Ltd., Tokyo, Japan

[21] Appl. No.: 608,407

[22] Filed: May 9, 1984

[30] Foreign Application Priority Data

May 11, 1983 [JP] Japan ................... 58-80896

[51] Int. Cl.$^4$ .................. G11B 5/147; G11B 5/187; G11B 5/17
[52] U.S. Cl. ..................... 360/126; 360/122; 360/123
[58] Field of Search ............... 360/119, 120, 122, 123, 360/125, 126

[56] References Cited

U.S. PATENT DOCUMENTS 3,795,954 5/1974 Alex et al. .................. 360/120
3,813,693 5/1974 Gooch et al. ................ 360/119
4,559,572 12/1985 Kumasaka et al. ............ 360/119

FOREIGN PATENT DOCUMENTS 0169214 12/1981 Japan ................... 360/122
0155513 9/1983 Japan ................... 360/122

*Primary Examiner*—Robert S. Topper
*Assistant Examiner*—Melissa J. Koval
*Attorney, Agent, or Firm*—Antonelli, Terry & Wands

[57] ABSTRACT

There is provided a structure of a composite type magnetic head and its manufacturing method. The composite type magnetic head comprises: two high permeability ferrite blocks with projections having nearly edged sections formed thereon; magnetic films having a high saturation flux density deposited on the side faces of the projections, the magnetic films confronting each other via a functional gap near front ends of said projections; guard films deposited over the magnetic films comprising a non-magnetic material; and non-magnetic materials filled on the guard films up to side face of the coil. This magnetic head exhibits excellent recording and reproducing characteristics. The contour effect is negligibly small. The reaction between the magnetic film and the non-magnetic material is prevented by the guard film.

13 Claims, 43 Drawing Figures

COMPOSITE TYPE MAGNETIC HEAD FOR RECORDING AND REPRODUCING HIGH FREQUENCY SIGNALS

The present invention relates to a magnetic head suitable for recording and reproducing high frequency signals which appear, for example, in a video tape recorder, and in particular to a composite type magnetic head suitable for a high coercive force recording medium and its manufacturing method.

It is well known that in a high density magnetic recording/reproducing apparatus it is advantageous to increase the coercive force Hc of the magnetic recording medium. A strong magnetic field is required for the information to be recorded on a high coercive force magnetic recording medium. However, the ferrite material currently used in a magnetic head has a saturation flux densiy Bs of approximately 4,000 to 5,000 Gauss, resulting in the limited strength of the attainable recording magnetic field. As a result, a coercive force Hc of a magnetic recording medium exceeding 1,000 oersted causes insufficient recording.

Some magnetic heads are made of metal magnetic materials. The metal magnetic materials are divide into magnetic crystalline alloys including a Fe-Al-Si alloy (referred to as a sendust alloy) and a Ni-Fe alloy (referred to as permalloy) and magnetic amorphous alloys. A magnetic head using the metal magnetic material has excellent characteristics such as a higher saturation flux density and lower rubbing noise as compared with the magnetic head using the ferrite material.

For a thickness corresponding to a recording track width not less than 10 μm which is generally used, the effective permeability of the magnetic head made of a metal magnetic material in the video frequency range becomes smaller than that of the magnetic head made of a ferrite because of the eddy current loss. Thus, the reproducing efficiency is lowered. In addition, the metal magnetic material is far beneath the ferrite in wear resistance.

To eliminate the above described problems, a composite type magnetic head so composed of a combination of ferrite and a metal magnetic material as to utilize their merits was proposed.

For example, a composite type magnetic head having the oblique view of the core as illustrated in FIG. 1 was proposed. In FIG. 1, a core 10 is made of ferrite having a large effective permeability. A functional gap environs 11 playing a major role in recording operation is made of a metal magnetic material formed by physical vapour deposition. For a high density recording magnetic head, cutting grooves 12 for recording track width are provided near the functional gap to reduce the track width. In the cutting grooves 12, a reinforcing non-magnetic material is filled. Reference numeral 13 denotes a coil-winding window. FIG. 2 is a plane view of a surface facing the magnetic recording medium of the above described conventional magnetic head. Boundaries 14 and 14' respectively between ferrite cores 10 and 10' and metal magnetic materials 11 and 11' function as pseudo gaps, resulting in deteriorated recording/reproducing characteristics. Especially when a functional gap 15 is in parallel to the boundaries 14 and 14', a considerable amount of signals are picked up at the boundaries 14 and 14', an enormous contour effect being caused.

A method to remove the contour effect by providing appropriate unevenness on the boundaries between the ferrite cores 10 and 10' and the metal magnetic material 11 and 11' is known. However, it is difficult to completely remove the contour effect.

Another conventional head has a structure as illustrated in FIG. 3. On a non-magnetic substrate 20, a metal magnetic material 21 having a high saturation flux density is formed so as to have a film thickness equal to the track width by physical deposition such as sputtering or vapour deposition. Onto the metal magnetic material film 21, a non-magnetic material 20' is attached via a thin glass film. The resultant integral body is divided into two equal parts. Then the gap forming surfaces are wrapped up. A coil-winding window 22 is attached to the gap forming surface 23 via a predetermined non-magnetic film to form a head. This structure has problems in forming a gap, resulting in inefficient productivity, poor gap length accuracy and deteriorated yield.

The following references are cited to show the state of the art; (1) Japanese Patent Laid-Open Publication (i) No. 140708/76, (ii) Japanese Patent Laid-Open Publication No. 47811/78, and (iii) Japanese Patent Laid-Open Publication No. 58824/80.

An object of the present invention is to provide a magnetic head which has not the above described drawbacks of the prior art and which exhibits excellent recording/ reproducing characteristics even for a high coercive force recording medium and provide the manufacturing method of the magnetic head.

To attain the above described object, a composite type magnetic head according to the present invention comprises two high permeability ferrite blocks having projections projected in a sectional view seen from the side of a surface facing a magnetic recording medium, the width of said ferrite at the front end of the projection being smaller than the track width, magnetic substances deposited over at least both side faces of said projections, each of said magnetic substances having a saturation flux density larger than that of the ferrite, said magnetic substances confronting each other via a functional gap near front ends of said projections; guard films deposited over said magnetic substances around side faces of said ferrite projections, said guard films comprising a non-magnetic material, and non-magnetic materials filled over said guard films up to the side face of the core, i.e., over the cutting groove of the conventional head. The side face of the core is in parallel with the running direction of the magnetic recording medium and crosses (in most cases falls at right angles) with the surface facing the magnetic recording medium.

It is desirable that the width of the projection becomes wider as the distance from the functional gap is increased. A too large vertical angle of the projection tends to cause an error in track width. A too small vertical angle causes mechanical weakness. In general, a preferable value of the vertical angle (or the angle formed by both side faces) is 30° to 90°. Even if the vertical angle is outside this range, however, the projection can be formed. The present invention is not limited to the angle range. The above described high permeability ferrite is usually Mn-Zn ferrite or Ni-Zn ferrite. As the magnetic substance, any high permeability material having magnetostriction around zero and having a higher saturation flux density than the above described ferrite may be used. Representative examples are a well known Fe-Si alloy, a Fe-Al-Si alloy (referred to as a sendust alloy), a Ni-Fe alloy (referred to as permalloy), and various kinds of high permeability amorphous alloys. Amorphous alloys having no crystalline structures are especially suitable to the structure of the magnetic head according to the present invention. Since the amorphous alloy is deposited by using a thin film forming technique such as sputtering, a binary alloy or a ternary alloy is preferable to quadruple and more alloys because of simple composition control. For example, systems of Co-Zr, Co-Nb, Co-Mo-Zr, Co-W-Zr, Co-Nb-Zr, Co-Ni-Zr, and Co-Zr-B may be used. In addition, it is also possible to use a magnetic substance having an alternately laminated structure of a non-magnetic substance layer such as $SiO_2$ or $Al_2O_3$ which is in the range of 100 Å to 1 $\mu$m in thickness and the above described non-magnetic substance layer having a high saturation flux density. It is well known that such alternate lamination of a magnetic substance layer and a non-magnetic substance layer improves magnetic characteristics. For raising the saturation flux density near the gap, it is described to form the functional gap plane by using only the above described magnetic substance. Even if the functional gap plane is formed by the above described magnetic substance and the above described ferrite, however, the effect of the present invention can be recognized as compared with the prior art whereby only ferrite is used. Into a space between the above described magnetic substance film on both sides of the ferrite block projection and the side face of the core, a non-magnetic material is filled to form a well known cutting groove of the core.

If the functional gap plane is composed of only the above described magnetic substance having a high saturation flux density, it is desirable that the width of the ferrite at the front end of the projection in the track width direction is not larger than half of the track width. The contour effect becomes negligible by processing the ferrite plane at the front end so that it will not be flat. Otherwise, the width of ferrite at the front end may be defined to be zero, i.e., the front end may be edged.

If the functional gap plane is composed of both the above described magnetic substance having a high saturation flux density and the above described ferrite, it is desirable that the total width of the magnetic substance on the gap plane in the track width direction is not less than the width of the ferrite for the purpose of raising the saturation flux density near the functional gap.

The thickness of the magnetic substance having a high saturation flux density deposited on both sides of the projection of the ferrite block is generally chosen to be not larger half of the track width. Because the width of the magnetic substance in the track width direction exposed to the surface facing the magnetic recording medium in the functional gap becomes equal to or larger than the sum of the thickness of the magnetic substance deposited over both sides of the ferrite projection. If the front end of the projection of the ferrite block is edged, the width of the functional gap becomes nearly equal to the sum of the magnetic substance thickness. Accordingly, it is desirable that the thickness of the magnetic substance is nearly half of the track width.

In accordance with the present invention, the magnetic substance is deposited on both sides of the ferrite block projection. If the magnetic substance is deposited on only one side of the projection, the junction area between the magnetic substance and the ferrite is reduced, the magnetic resistance of the magnetic circuit being increased. Further, in this case, the thickness of the deposited magnetic substance must be nearly as large as the track width. In addition, the processes will be complicated since the magnetic substance must be deposited over only one side.

It is a matter of course that the magnetic substance is provided on the surface facing the magnetic recording medium. However, there are three distinct cases as follows. In the first case, the magnetic substance starting from the surface facing the medium passes through a coil-winding window, if provided, and reaches the rear portion without being interrupted and thence reaches the surface opposite that facing the medium. In the second case, the magnetic substance is interrupted at the coil-winding window. In the third case, the magnetic substance is provided only between the surface facing the medium and the coil-winding window. Two core halves to be combined assume respectively one of the above three cases. The arrangement of the magnetic substance might be the same or different in two core halves. The magnetic head in either case is the composite type magnetic head according to the present invention and provides a high recording field strength. When both core halves are in the first case, the magnetic film forms a round magnetic circuit and the ferrite portion serves as an auxiliary core, the recording characteristics at high frequencies being improved. In one example of this case, the internal wall of the coil-winding window is also coated with the magnetic substance and the magnetic film forms a magnetic circuit loop. In another example of that case, the loop of the magnetic substance passing through the outside of the coil-winding window is formed. In the former example, the vertical angle of the projection (or the angle formed by both side faces) is desired to be 30° to 90°. In the latter example, the vertical angle is desired to be 10° to 20°.

In the above described first case, the magnetic circuit is composed of the magnetic substance having a high saturation flux density and ferrite having high permeability. At least, a ring-shaped magnetic circuit is constituted by the magnetic substance having a high saturation flux density. When the depth of the groove forming the ferrite projection is smaller than that of the coil-winding groove, a magnetic circuit is formed through the outside magnetic film formed on the internal wall of the coil-winding window is constituted. Of course, the magnetic flux passes through the ferrite as well. When the depth of the groove forming the ferrite projection is larger than that of the coil-winding groove, a magnetic circuit is formed through the outside of the coil-winding window by the magnetic film. In this case as well, it is more desirable that the magnetic film is formed on the internal wall of the coil-winding groove. When the magnetic film is to be formed on the internal wall of the coil-winding groove, it can be easily attained by providing a slanted face to the groove shape so that the groove will not have a right angle portion. The sputtering technique provides sufficient magnetic film, even on a right angle portion, because of good step coverage.

In the above described second case of third case, the magnetic circuit can not be formed only by the magnetic film. At the interruption of the magnetic film, the magnetic flux passes through the ferrite. A higher recording magnetic field can be obtained as compared with the case where the core comprises only ferrite.

On the magnetic substance deposited on both sides of the ferrite projection, a guard film comprising a non-magnetic material which has wear resistance and which can be deposited as a thin film is provided. This guard film is made of an oxide such as $Al_2O_3$, $SiO_2$, $ZrO_2$, $SiO_2$, $TiO_2$, $MgO \cdot SiO_2$, nitride, carbide, or ceramic material such as a boronide. The guard film is larger than 1 μm in thickness. If the thickness of the guard film is not larger than 1 μm, the guard effect is reduced and reaction is caused between the magnetic film and a non-magnetic material for filling provided on the guard film in the heating process, deteriorating the magnetic characteristics of the magnetic film. If the guard film is not provided and the filling non-magnetic material is provided directly on the magnetic film, it is a matter of course that the magnetic characteristics of the magnetic film is deteriorated. If the guard film is too thick, the quantity of the non-magnetic material for filling of the cutting groove of the core is reduced. When two core halves are to be jointed, therefore, the junction area defined by the non-magnetic material for filling is reduced, lowering the junction strength. When the thickness of the guard film is 30 μm or more, increasing the thickness does not improve guard action for the magnetic film. Therefore, it is practically desirable that the guard film is below 30 μm in thickness. As the non-magnetic material for filling the portion corresponding to the cutting groove, glass, ceramics, a resin or the like may be used. In view of the stability and junction characteristics of core halves, glass is especially suitable.

The above described magnetic head is generally composed of two core halves having the essentially same structures excepting the coil-winding window. However, it is permissible that only one core half has the above described structure and the other core half has a different structure excepting the existence of the second magnetic substance having a higher saturation flux density than the ferrite on the functional gap plane. For example, it is permissible that one of the magnetic substances having high saturation flux densities and confronting each other via a functional gap composed of a non-magnetic material is the first magnetic substance having a high saturation flux density compound on the ferrite in the compound material having the above described structure and the other of the magnetic substances is a second magnetic substance having a high saturation flux density deposited on that compound material. In this case, it is possible to make the winding coil by using the thin film fabrication technique. Materials of the magnetic substances may be the same or different.

Common knowledge in the art is applicable to the composite type magnetic head according to the present invention excpeting the facts described in this specification.

The above describe composite type magnetic head having a plurality of ferrite blocks according to the present invention can be easily fabricated by using a manufacturing method comprising the steps of: (i) forming coil-winding groove on the gap plane of at least one block which belongs to a pair of blocks comprising high permeability ferrite; (ii) forming at least one pair of parallel grooves perpendicular to the coil-winding groove on the gap plane of the ferrite block which has been subjected to the step (i), a projection having an edge narrower than the track width being formed by the pair of parallel grooves; (iii) depositing a magnetic substance having a saturation flux density higher than the ferrite block on at least the surface of the coil-winding groove and the surface of the grooves having the projection put between in the gap plane side of the ferrite block, (iv) depositing a guard film comprising a non-magnetic material on the magnetic substance and then filling a non-magnetic material for filling, into the projection forming grooves coated with the magnetic substance and the guard film; (v) removing unnecessary portions of the non-magnetic material, the guard film, and the magnetic substance to expose the gap plane so that the magnetic substance may have a predetermined track width; (vi) preparing a pair of blocks which have been subjected to the step (v) and forming an non-magnetic layer having a required thickness on the gap plane of at least one block belonging to the pair of blocks; (vii) confronting the gap plane of one block of the pair of blocks which have been subjected to the step (vi) with the gap plane of the other block of the pair of blocks and jointing and integrating the pair of blocks each other; and (viii) cutting the pair of blocks thus jointed at predetermined positions to yield at least one magnetic core.

In the process (i), at least the side wall of the recording medium side of the coil-winding groove is slanted. It is not desirable to slant both side walls since the magnetic film tends to be attached to the walls. In the process (ii), it is recommended that the grooves run through the gap plane from one edge to the other edge. However, the grooves may be provided on only one endge side.

A magnetic head according to the present invention can also be easily fabricated by using a manufacturing method comprising the steps of: (I) forming at least one pair of parallel grooves on the gap plane of a block comprising high permeability ferrite, a projection having an edge narrower than the track width being fromed by said pair of parallel grooves; (II) depositing a magnetic substance having a saturation flux density higher than the ferrite block on at least the surface of the parallel grooves in the gap plane of the ferrite block; (III) depositing a guard film comprising a non-magnetic material on the magnetic substance and then filling a non-magnetic material for filling, into the projection forming grooves coated with the magnetic substance and the guard film; (IV) removing unnecessary portions of the non-magnetic material for filling, the guard film, and the magnetic substance to expose the gap plane having a predetermined track width; (V) preparing a pair of blocks which have been subjected to the step (IV) and forming a coil-winding groove nearly perpendicular to the parallel grooves on the gap plane of at least one block belonging to the pair of blocks; (VI) forming a non-magnetic layer having a required thickness on the gap plane of at least one block belonging to the pair of blocks which have been subjected to the step (V); (VII) confronting the gap plane of one block of the pair of blocks which have been subjected to the step (VI) with the gap plane of the other block of the pair of blocks and jointing and integrating the pair of blocks each other; and (VIII) cutting the pair of blocks thus jointed at predetermined positions to yield at least one magnetic core.

In the process (I), the grooves may be formed to run through the gap plane of the block from one edge to the other edge or may be provided on only one edge side. In the process (I) or in the process (ii) of the above described manufacturing methods, the front end of the projection between adjacent grooves may be processed to generate a flat face or may be processed not to generate a flat face. In the process (I) or the process (ii), the front end of the projection may be at the same level as the flat portion adjacent to the pair of grooves or may be lower than it. If the front end of the projection is made lower than the adjacent flat portion, the level difference should not exceed the thickness of the magnetic substance having a high saturation flux density, i.e., half of the track width. Otherwise, the above described level difference exists after the magnetic substance has been formed on the projection, preventing the process (VII) or (vii).

In the composite type magnetic head according to the present invention, a larger portion occupied by the core is made of a bulk material having high permeability such as Mn-Zn ferrite or Ni-Zn ferrite. A portion forming the functional gap, a larger portion around it and a portion around the coil-winding window if required is made of a magnetic material such as a crystalline alloy like Fe-Si system, Fe-Al-Si system, or Ni-Fe system or an amorphous alloy and formed by physical deposition such as sputtering or evaporation. According to circumstances, chemical deposition or plating may be used. Further, the magnetic substance having a high saturation flux density may be a material other than magnetic metal substances provided that it can be deposited.

Common knowledge in the art is applicable to the composite type magnetic head according to the present invention excepting the facts described in this specification.

The present invention will be apparent from the following detailed description taken in conjunction with the accompanying drawings, in which.

Figure 17A:
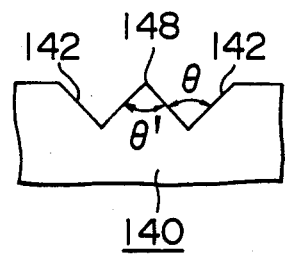
Figure 17B:
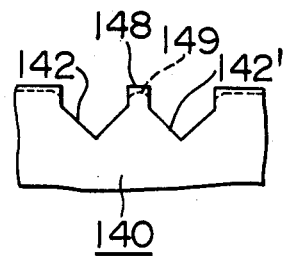
Figure 17C:
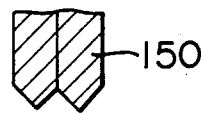

FIG. 17a., 17b and 17d are plane views of ferrite blocks processed in various embodiments of the present invention; and FIG. 17c is a sectional view of a ferrite block processing cut-off blade used in still another embodiment of the present invention.

The structure and the manufacturing method of the present invention will now be described in detail by referring to embodiments.

Embodiment 1

Figure 1:
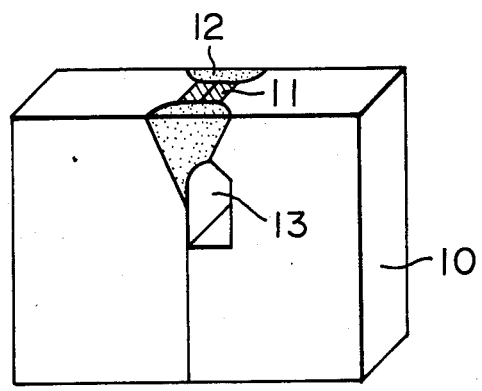
FIGS. 1 and 2 are respectively an oblique view and a top view of a composite type magnetic head of the prior art.
Figure 2:
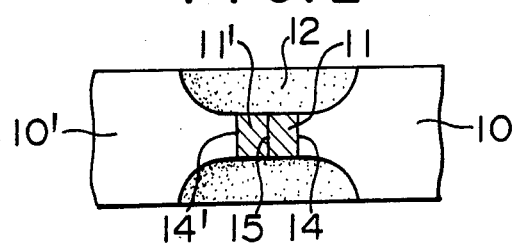
Figure 3:
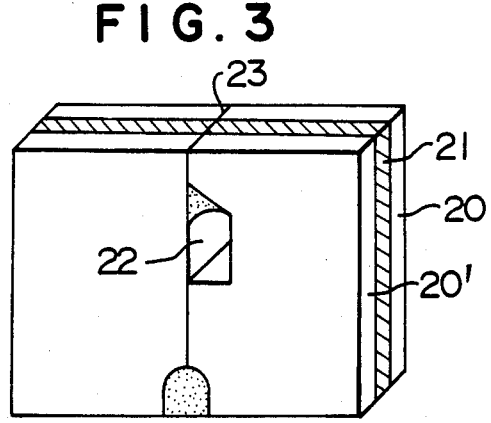
FIG. 3 is an oblique view of another composite type magnetic head of th prior art.
Figure 4A:
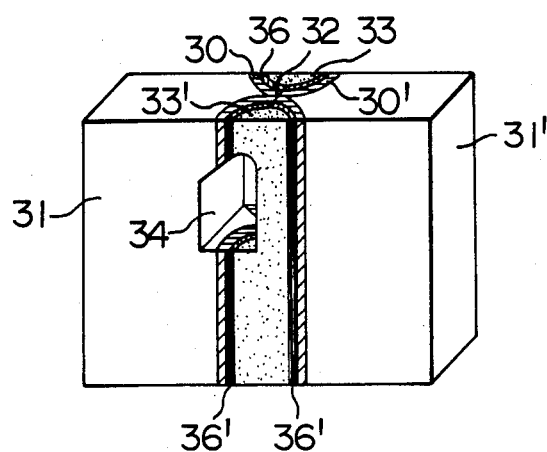
FIGS. 4a and 4b are an oblique view and an enlarged view of a surface rubbing the magnetic tape thereof, respectively of an embodiment of a composite type magnetic head according to the present invention.
Figure 4B:
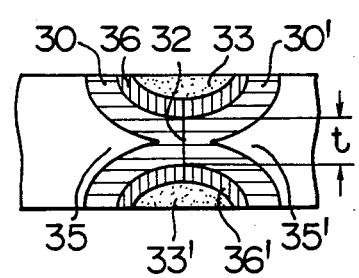

FIGS. 4a and 4b are respectively an oblique view and a plane view of the first embodiment of a compound magnetic head according to the present invention. A track portion 30 and a functional gap 30' are made of magnetic metal substances having high saturation flux densities such as crystalline magnetic alloys including Fe-Si, Fe-Al-Si and Ni-Fe or such as an amorphous alloy. The alloy has magnetostriction around zero and has a saturation flux density larger than that of the ferrite. Bulk materials 31 and 31' having high permeability such as Mn-Zn ferrite or Ni-Zn ferrite are magnetically coupled to the above described magnetic metal substances.

On gap forming surfaces of a pair of magnetic metal substances, a predetermined non-magnetic film is formed to make a functional gap 32. The track width is narrower than the core width. For defining the track width, cutting grooves are provided. While leaving ferrite sections having widths smaller than the track widths on the gap forming surfaces, the cutting grooves are formed on both sides of the ferrite sections from the core front face to its rear face. Onto sides of the ferrite projections thus lets, the above described magnetic metal materials 30 and 30' are attached by using a thin film forming technique such as sputtering or vapour deposition. Onto the magnetic metal materials 30 and 30', guard films 36 and 36' made of a non-magnetic material such as $Al_2O_3$ are deposited by approximately 5 $\mu$m by using the sputtering technique. Into the grooves, non-magnetic materials 33 and 33' such as glass, ceramics or resin are filled. Reference numeral 34 denotes a coil-winding window. FIG. 4b is an enlarged view of the magnetic tape rubbing surface. In accordance with the present invention, magnetic metal films 30 and 30' are formed over both sides of ferrite projections 35 and 35'. Accordingly, the thickness of the magnetic metal substance is a small as approximately half the track width t, the film forming time being reduced. If the frite projections 35 and 35' in the magnetic tape rubbing surface illustrated in FIG. 4b are formed to become wider as they are further from the functional gap 32, magnetic metal films can be efficiently formed by sputtering from the functional gap surface side. Since the above described magnetic metal film is divided into two portions, the effect of the eddy current loss can be reduced even for a single layer film. In addition, there is no fear of characteristics deterioration due to the contour effect, since the shape of the joint between the ferrite portion and the magnetic metal film is not in parallel with the functional gap 32. The wear resistance and mechanical strength are assured since the ferrite projections 35 and 35′ form cores of the magnetic metal films and extend nearly to the functional gap. In addition, the present invention is suitable to a magnetic head having a track width less than ten and several micron because it becomes unnecessary to process cutting grooves for defining the track width after the magnetic metal films are attached and hence the problem of film peeling off during processing is eliminated.

Since the magnetic metal film is covered by the guard film, it becomes possible to obviate deterioration in magnetic characteristics caused due to reaction between the magnetic film and the non-magnetic material for filling during the heating process such as the joint of half cores, resulting in excellent recording and reproducing characteristics.

Embodiment 2

Figure 5A:
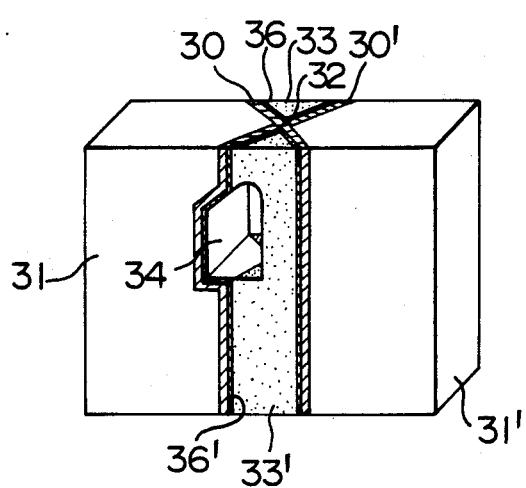
FIGS. 5a and 5b are respectively an oblique view and a plane view of another embodiment of a composite type magnetic head according to the present invention.
Figure 5B:
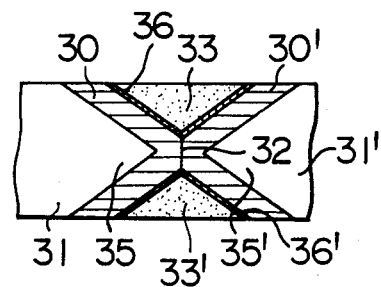

FIGS. 5a and 5b are respectively an oblique view and a plane view of the second embodiment of a composite type magnetic head according to the present invention. The magnetic head of this embodiment is the same as that of the embodiment 1 excepting that both side faces of magnetic metal substances 30 and 30′ are plane and that a magnetic circuit loop is formed from the functional gap through the internal wall of the coil-winding window 34. Since the magnetic metal film 30 having a high saturation flux density reaches the face opposite that confronting the magnetic recording medium without being interrupted at the coil-winding window. As a result, the high frequency characteristics have been improved.

Figure 6:
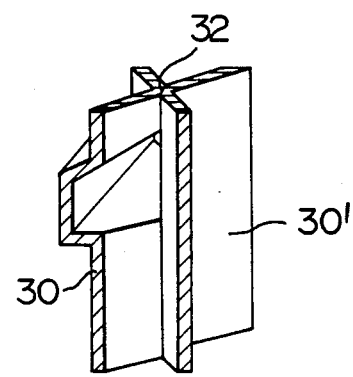
FIG. 6 is an oblique view of a magnetic film portion in the magnetic head illustrated in FIGS. 5a and 5b.

FIG. 6 is an oblique view of the magnetic films 30 and 30′ extracted from the magnetic head core illustrated in FIG. 5a. Thus, the magnetic films constitute a magnetic circuit loop.

Embodiment 3

Figure 7A:
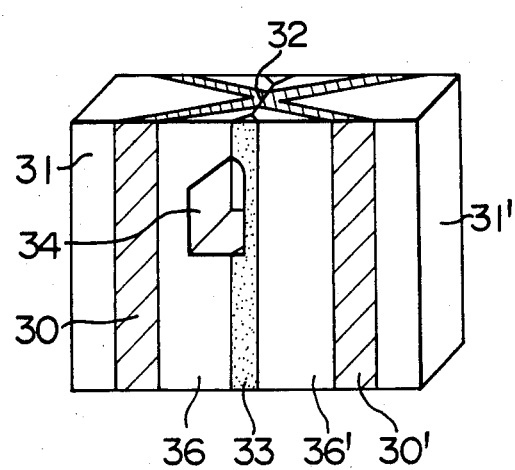
FIGS. 7a and 7b are respectively an oblique view and a plane view of still another embodiment of a composite type magnetic head according to the present invention.
Figure 7B:
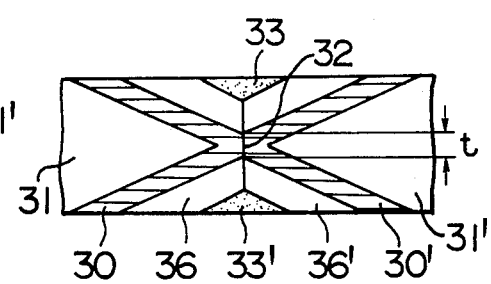

FIGS. 7a and 7b are respectively an oblique view and a plane view of another embodiment of a composite type magnetic head according to the present invention. A groove for forming the above described ferrite projections is formed deeper than a coil-winding groove (window) 34. And a magnetic substance film 30 attached to both sides of the groove extends to the outside of the coil-winding window. In this way, the magnetic film passes through the outside of the coil-winding widnow to form a magnetic circuit loop. It is more desirable to form a magnetic film on the internal wall of the coil-winding window as well. Similarly to the embodiments 1 and 2, guard films 36 and 36′ made of a non-magnetic material are formed over the magnetic films 30 and 30′. Into grooves, non-magnetic materials 33 and 33′ such as glass, ceramics or resin are filled to constitute reinforcements for jointing two core halves. Reference numerals in FIGS. 7a and 7b that are like reference numerals in FIGS. 4a and 4b refer to like parts.

Embodiment 4

Figure 8A:
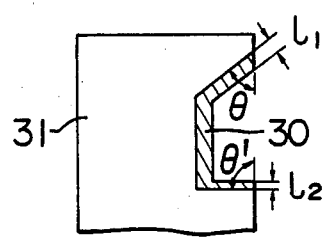
FIGS. 8a and 8b are enlarged plane views for illustrating shapes of coil-winding windows of still another embodiment of a composite type magnetic head according to the present invention.
Figure 8B:
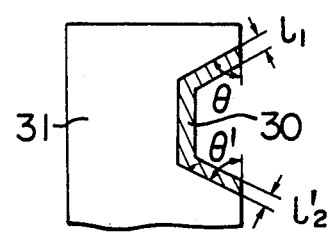

FIGS. 8a and 8b are enlarged plane views of a magnetic film 30 of a coil-winding window used in another embodiment of a composite type magnetic head according to the present invention. FIG. 8a shows the shape of a conventional coil-winding window. Since the rear side face is perpendicular to the bottom of the groove, the thickness $l_2$ of the magnetic film formed by vapour deposition becomes smaller than the thickness $l_1$ of the included front end. When the inclination $\theta$ of the front end is 60° and the angle $\theta'$ of the rear end is 90°, for example, the thickness $l_2$ is approximately one third of the thickness $l_1$. In accordance with the present invention, therefore, $\theta'$ is chosen to be less than 90°. It is desirable to let $\theta$ and $\theta'$ be in the range of 30° to 80°. If $\theta$ is less than 30°, the magnetic circuit becomes long, resulting in worse head characteristics. The angle $\theta'$ is not required to be the same as the angle $\theta$.

Even if the angle $\theta'$ is 90°, the magnetic film can be formed without a problem by using the sputtering technique.

The guard film is omitted in FIG. 8.

Embodiment 5

Figure 9A:
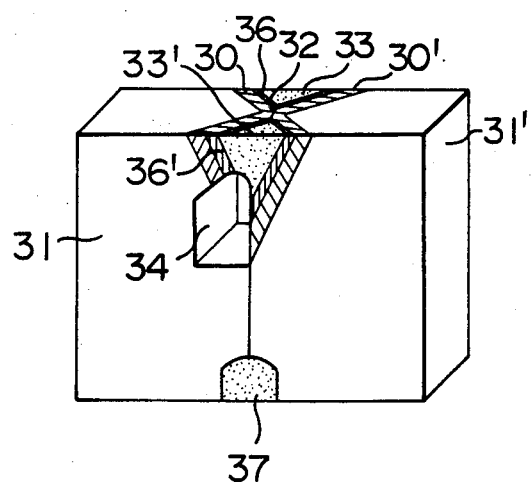
FIGS. 9a and 9b are an oblique view and an enlarged view of a surface facing the magnetic recording tape thereof of still another embodiment of a composite type magnetic head according to the present invention, respectively.
Figure 9B:
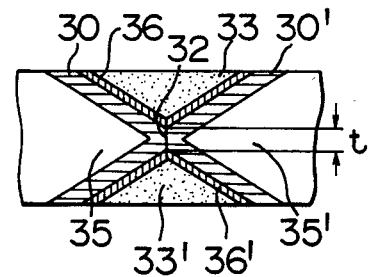

FIGS. 9a and 9b are respectively an oblique view and a plane view of another embodiment of a composite type magnetic head according to the present invention. The cutting groove is formed only on the front portions of the magnetic head core, i.e., the side of the surface facing the magnetic recording medium. And the rear portions of the magnetic head core halves are in contact with each other over the entire width of the ferrite core. Even for a magnetic head having a narrower track, therefore, an efficient narrow track head can be obtained since the magnetic resistance of the rear portion is not increased. Reference numerals in FIGS. 9a and 9b that are like reference numerals in FIGS. 4a and 4b refer to like parts. The shape of the cutting groove of reinforcements 33 and 33′ can be chosen by selecting a cut-off blade. Ferrite projections (namely protrusions) 35 and 35′ are widened as they are further from the functional gap. A predetermined azimuth loss is produced to reduce the crosstalk. It is desirable to locate the ferrite projections near the functional gap, if possible, since the eddy current loss near the functional gap plane can be reduced. Further, for the magnetic head having the structure illustrated in FIG. 9a, it is desirable to provide a cutting groove on the joint located in the rear portion of the core and fill a reinforcement 37 into the cutting groove.

Other items are the same as those in the embodiment 1.

Embodiment 6

Figure 10:
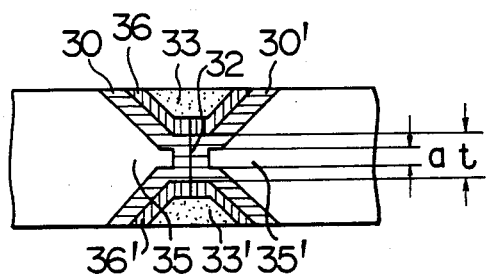
FIG. 10 is an enlarged view of a surface facing the magnetic recording tape thereof of still another embodiment of a composite type magnetic head according to the present invention.

FIG. 10 is a plan view of another embodiment of a composite type magnetic head according to the present invention. FIG. 10 illustrates on enlarged view of a surface rubbing a magnetic tape. Even if the jointing faces of the front ends of ferrite projections 35 and 35′ which form cores of the magnetic metal films 30 and 30′ have portions in parallel to the functional gap surface, the contour effect does not exceed 0.5 dB provided that the width a of the ferrite projection is not larger than half of the track width t, hardly posing a problem. It is more desirable to process the ferrite projections so that their front ends will not be flat.

Reference numerals in FIG. 10 that are like reference numerals in FIGS. 4a and 4b refer to like parts. The structure of this embodiment is the same as that of FIGS. 1 to 5 excepting just described points.

Embodiment 7

Figure 11:
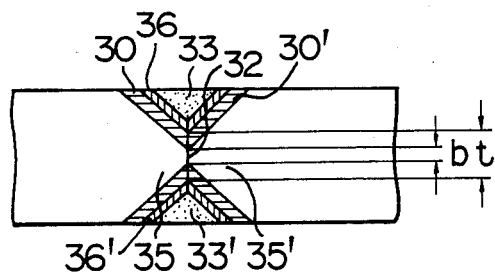
FIG. 11 is an enlarged view of a surface facing the magnetic recording tape thereof of still further another embodiment of a composite type magnetic head according to the present invention;.

FIG. 11 is a rough plane view of another embodiment of a composite type magnetic head according to the present invention and illustrates an enlarged view of the surface of the head rubbing the magnetic tape. In the magnetic head of the present embodiment, a functional gap 32 is formed by magnetic metal films 30 and 30' as well as ferrite 35 and 35'. The width of the above described magnetic metal film constituting the track width t is chosen to be not less than twice the width b of the ferrite. Thus, the magnetic metal substance having a high saturation flux density plays a dominant role in recording, while the ferrite having high permeability plays a dominant role in reproducing. As a whole, the reproduction efficiency can be raised. A wider ferrite width causes insufficient recording at the center of the track, resulting in the deteriorated reproduction output.

Reference nuemrals in FIG. 11 that are like reference numerals in FIGS. 4a and 4b refer to like parts. The structure of the present embodiment is the same as that of of embodiments 1 to 5 excepting just described points.

Embodiment 8

In a composite type magnetic head of the present embodiment, the front end of the above described ferrite projection has at least one indentation. The magnetic head of the present invention is suitable to a wide track width. No problems are caused even for a track width exceeding 100 μm.

Figure 12A:
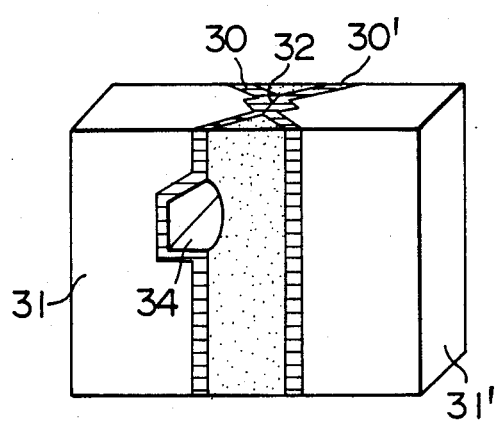
FIGS. 12a and 12b are respectively an oblique view and a plane view of a modified embodiment of a composite type magnetic head according the present invention.
Figure 12B:
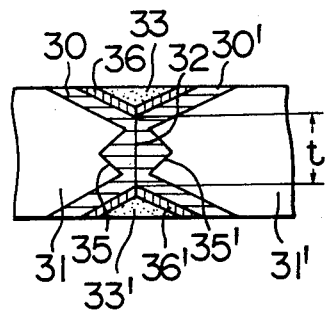

FIGS. 12a and 12b are respectively an oblique view and a plane view of a composite type magnetic head according to the present embodiment. The plane view of FIG. 12b illustrates the surface facing the magnetic recording medium. The thickness of the magnetic films 36 and 36' is chosen to be 20 to 50 μm for the track width of 50 to 150 μm.

Reference numerals in FIGS. 12a and 12b that are like reference numerals in FIGS. 4a and 4b refer to like parts. In FIG. 12a, guard films 36 and 36' are not illustrated.

Two or more indentations may be used instead of one indentation. further, instead of the linear indentation of the ferrite projection exposed to the surface facing the magnetic recording medium, a curved indentation may be used.

The structure of the present invention is the same as that of the above described embodients excepting just described points.

Although basic shapes of the present invention have been described by referring to embodiments, the embodiments do not specifically define the exterior shape. If one of the core halves is extended to be used for a core slider, it can be used as a floating-type magnetic head for a magnetic disk.

As heretofore described, a composite type magnetic head can sufficiently record the information onto a magnetic recording medium having a high coercive force. The magnetic metal substance having a high saturation flux density is combined with the ferrite having high permeability and high wear resistance to compensate defaults each other, resulting in a narrow-track magnetic head having excellent recording and reproducing characteristics.

In drawings for illustrating magnetic heads, coils are mounted although they are not illustrated.

Manufacturing methods of the above described composite type magnetic heads will now be described in detail by referring to embodiments.

Embodiment 9

Respective processes of the first manufacturing method according to the present invention are illustrated in FIGS. 13a to 13i.

Figure 13A:
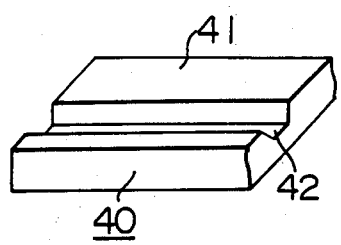
FIGS. 13a to 13i illustrate processes included in an embodiment of a composite type magnetic head manufacturing method according to the present invention.

(i) FIG. 13a shows a process for forming a coil-winding groove 42 on a gap plane of a ferrite block 40 having high permeability. The surface 41 is polished like a mirror beforehand. The high-permeability ferrite comprises monocrystalline or multicrystalline Mn-Zn ferrite or Ni-Zn ferrite. At least the front end of the groove 42 is inclined. Inclining the rear portion facilitates formation of the magnetic film. The process (a) has heretofore been described.

(ii) In the process (b), on the gap forming surface 41 produced in the process (a), a plurality of sets of parallel grooves are formed perpendicular to the coil-winding groove so as to leave projections narrower than the track width. A set of grooves consist of two adjacent grooves 43 and 43'. Grooves can be formed by using a metal bonded cut-off blade or a resinaid bonded cut-off blade having a V-shaped or U-shaped edge as well as a high-speed dicing saw. The flat portion 44 left between adjacent sets of grooves serves as a reinforcement and a reference plane of the magnetic metal film in succeeding processes such as abrasion in process (e) or block jointing in process (h).

Figure 13B:
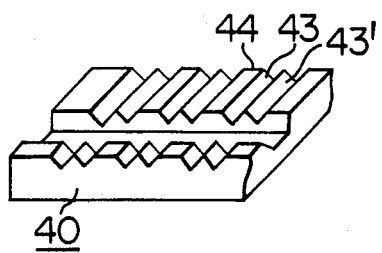
Figure 13C:
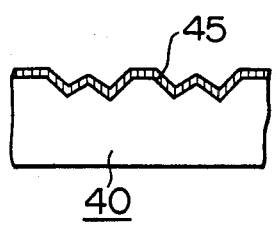
Figure 13D:
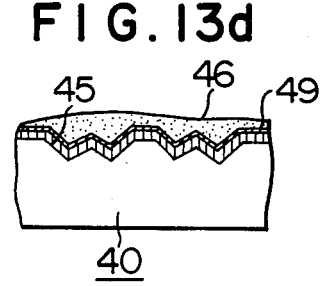
Figure 13E:
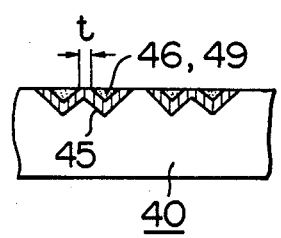

(iii) FIG. 13c shows an enlarged sectional view of grooves 43 and 43' formed in the process illustrated in FIG. 13b. (Hereafter, processes corresponding to FIG. 13b, FIG. 13c and so on are referred to as process (b), process (c) and so on.) In the process (c), a magnetic metal film 45 having a higher saturation flux density as compared with ferrite is deposited over the entire gap forming surface including grooves formed in the process (b) by sputtering. The magnetic metal substance may be a magnetic crystalline alloy or a magnetic amorphous alloy. The magnetic crystalline alloy is Fe-Si alloy (Si - 6.5 weight %), Fe-Al-Si alloy (sendust alloy), or Ni-Fe alloy (permalloy), for example. The magnetic amorphous alloy is a well known metal-metalloid alloy such as Co-Fe-Si-B or a well known metal-metal alloy such as Co-Zr or Co-Mo-Zr, for example. As the deposition method, the vapour deposition, ion plating, chemical deposition or gilding is permitted. However, these methods are applicable only to limited kinds of metals and cause a large composition variation. Accordingly, the sputtering technique is the most desirable. In addition, the sputtering technique provides high adhesion strength and sufficient film spread into grooves. These advantages make sputtering suitable to the present invention. The process (c) is performed after at least processes (a) and (b). Because the magnetic film must be deposited on the internal wall of the coil-winding groove as well. If the coil-winding groove is formed after the magnetic film has been deposited, burr characteristic of metals is caused on the edge of grooves, deteriorating plane accuracy. Thus, deburring grinding is required. If grinding after forming the coil-winding groove causes face droop in important portions of the functional gap (edge 48 in FIG. 13f), deteriorating the gap accuracy.

(iv) In the process (d), a guard film 49 is formed over the magnetic metal film produced in the process (c) and a non-magnetic material 46 is so filled as to bury at least remaining grooves. As the non-magnetic material 46, an inorganic binding material such as glass or ceramics or a hard resin is used. In view of the stability, glass is suitable to the non-magnetic material 46. If the magnetic metal film 45 is made of a magnetic crystalline alloy, a glass material can be chosen out of wide range of materials having an operation temperature below 800° C. In case of an amorphous alloy, a glass material having an operation temperature at least below the crystallization temperature is chosen and a low melting point glass having an operation temperature below 500° C. is required. The non-magnetic material of the guard film 49 guards the magnetic film. It is common to deposit $Al_2O_3$ having wear resistance by a predetermined thickness by using sputtering technique and then fill glass as filling non-magnetic material into the remaining portions. The glass can be used as a binding material for jointing two blocks in process (h).

(v) In the process (e), the unnecessary non-magnetic material 46, guard film 49 and magnetic metal film 45 of the block obtained in the process (d) are removed to expose the gap plane. The removal is executed by grinding and abrasion. The gap forming surface is obtained by the final mirror-like polishing. The mirror-like polishing is continued until the above described track width t is obtained.

Figure 13F:
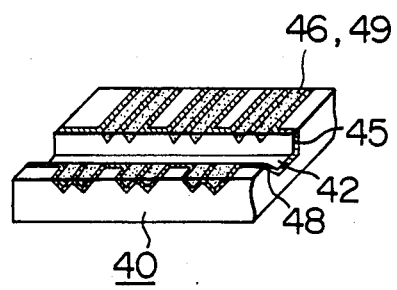
Figure 13G:
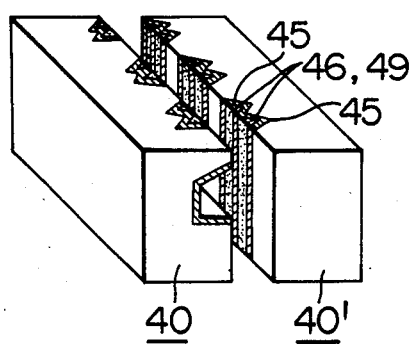

(vi) FIG. 13f is an oblique view of one core block having a coil-winding groove obtained in the process (e). The other core block may have no coil-winding grooves. In FIGS. 13e to 13h, the guard film 49 is illustrated together with the filling material 46 without making a distinction. In the process (f), a non-magnetic material such as $SiO_2$ or glass is sputtered on the gap forming surface of at least one core block belonging to a pair of core blocks up to a pair of predetermined thickness to form a gap forming film.

(vii) In the process (g), the gap plane of the block 40 belonging to the pair of blocks is so confronted by that of the block 40' belonging to the pair of blocks that their track portions will be matched. Blocks 40 and 40' are jointed and integrated while being heated and pressurized. If the non-magnetic material 46 filled in the groove is glass, jointing is performed by glass of both blocks. If a resin or ceraics material is used, cutting grooves are formed in a part of the coil-winding window and in the junction of the rear portion, and then jointing is performed by a resin or the like.

Figure 13H:
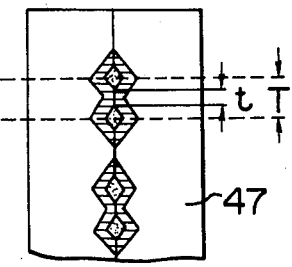
Figure 13I:
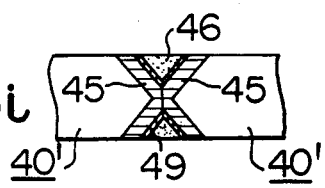

(viii) FIG. 13h shows the surface rubbing the magnetic tape of the jointed block 47 obtained in the process (g). In the process (h), as shown by dotted lines, the block is cut into divisions each of which has a predetermined core width T around the track width to produce a plurality of composite type magnetic heads. Sometimes the block is cut into divisions with the cutting line slanted by the azimuth angle. In this way, a narrow track composite type magnetic head core which has a surface rubbing the magnetic tape as illustrated in FIG. 13i is obtained. By winding a coil around the magnetic head core, a composite type magnetic head according to the present invention is obtained.

Embodiment 10

Figure 14A:
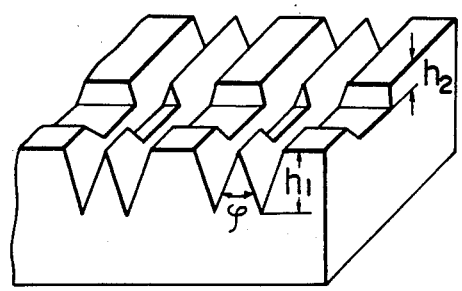
FIGS. 14a and 14b are respectively an oblique view and a plane view of a ferrite block processed by another embodiment of a composite type magnetic head manufacturing method according to the present invention.
Figure 14B:
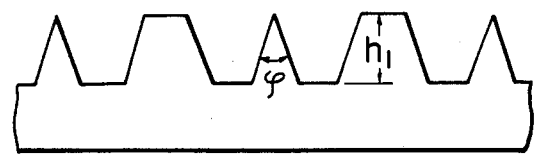

FIGS. 14a and 14b illustrate another embodiment of a manufacturing method according to the present invention. According to this embodiment, in the processes (a) and (b) illustrated in FIGS. 13a and 13b for forming the coil-winding groove and projections, the depth $h_1$ of the groove forming the projection is made larger than the depth $h_2$ of the coil-winding groove. Thereby, the magnetic circuit loop forming the magnetic head passes through the outside of the coil-winding window by means of the magnetic film itself. In addition, the internal window of the coil-winding window can also be coated with the magnetic film, the recording/reproducing efficiency of the magnetic head being raised. The depth $h_1$ is chosen to be 0.4 to 0.6 mm and $h_2$ is chosen to be 0.3 to 0.4 mm. Assuming that the core thickness is 0.15 to 0.2 mm, the suitable angle $\theta$ of the projection is 10° to 20°. If the depth $h_1$ of the groove forming the projection is too large, the inside of the groove can not be sufficiently coated with the magnetic film. The problem is eliminated by widening the groove width as illustrated in FIG. 14b. Other processes are the same as manufacturing processes as illustrated in FIGS. 13a to 13i. The completed magnetic head core is illustrated in FIGS. 7a and 7b.

Embodiment 11

Still another embodiment of a manufacturing method according to the present invention will now be described by referring to FIGS. 15a to 15i which represent manufacturing processes.

Figure 15A:
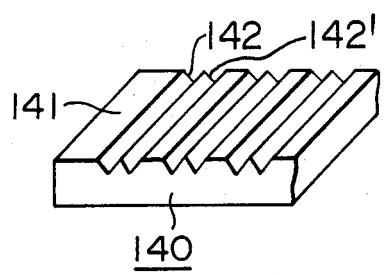
FIGS. 15a to 15i illustrate processes included in still another embodiment of a composite type magnetic head manufacturing method according to the present invention.
Figure 15B:
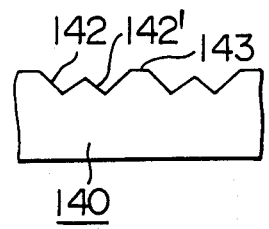
Figure 15C:
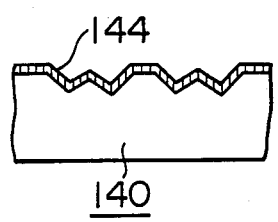
Figure 15D:
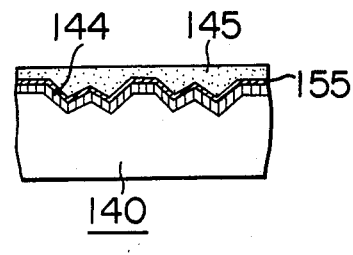

(I) In the process (a) illustrated in FIG. 15a, on a gap forming surface 141 of a block 140 made of ferrite having high permeability, a plurality of sets of parallel grooves are formed so as to leave projections narrower than the track width. A set of grooves consist of two adjuacent grooves 142 and 142'. The high-permeability ferrite comprises monocrystalline or multicrystalline Mn-Zn ferrite or Ni-Zn ferrite and forms the principal part of the magnetic core. Grooves can be formed by using a metal bonded cut-off blade or a resinaid bonded cut-off blade having a V-shaped or U-shape edge as well as a high-speed dicing saw. It is also possible to simultaneously form grooves 142 and 142' by overlapping two cut-off blades. FIG. 15b is an enlarged sectional view of grooves 142 and 142' formed in the process (a).

The flat portion 143 left between adjacent sets of grooves serves as a reinforcement and a reference plane of the magnetic metal film in succeeding processes such as abrasion in process (e) or block jointing in process (h).

(II) In the process (c), a magnetic metal film 144 having a higher saturation flux density as compared with ferrite is deposited over the entire gap plane including grooves formed in the process (a) by sputtering. The magnetic metal substance and the method for depositing it are the same as those described in the embodiment 9.

The thickness of the magnetic metal film deposited may be defined to be approximately half the required track width. Even if a single magnetic film is used, therefore, the eddy current loss can be reduced as compared with the prior art. If necessary, a multilayer film composed of alternately laminated non-magnetic materials as described before may also be used.

(III) In the process (d), a guard film 155 is formed over the magnetic metal film produced in the process (c) and a non-magnetic material 145 is so filled as to bury at least remaining grooves. As the non-magnetic material 145, an inorganic binding material such as glass or ceramics or a hard resin is used as described before. In view of the stability, glass is suitable to the non-magnetic material 145. The operation temperature of the galss is the same as that of the embodiment 9.

(IV) In the process (e), the unnecessary non-magnetic material 145, guard film 155 and magnetic metal film 144 of the block obtained in the process (d) are removed to expose the functional gap forming surface composed of the magnetic metal film having a required track width t. The removal is executed by grinding and abrasion. The gap plane is obtained by the final mirror-like polishing. The mirror-like polishing is continued until the above described track width t is obtained. In FIGS. 15e to 15h, the guard film 155 is illustrated together with the filling material 145 without making a distinction.

(V) In the process (f), a coil-winding groove 146 is formed on at least one block 140' belonging to a pair of blocks obtained in the process (e). A non-magnetic material such as SiO₂ or glass is then sputtered on the gap plane up to a required thickness to form a gap forming film.

(VI) In the process (g), the gap plane of the block 140 belonging to the pair of blocks is so confronted by that of the block 140' belonging to the pair of blocks that their track portions will be matched. Blocks 140 and 140' are jointed and integrated while being heated and pressurized. If the non-magnetic material 145 filled in the groove is glass, jointing is performed by glass of both blocks. If a resin is used, cutting grooves are formed in a part of the coil-winding window and in the junction of the rear portion, and then jointing is performed by the resin.

Figure 15E:
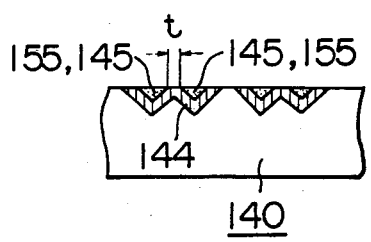
Figure 15F:
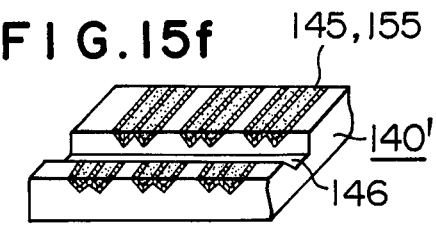
Figure 15G:
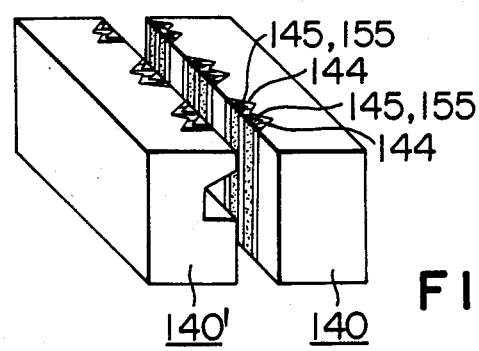
Figure 15H:
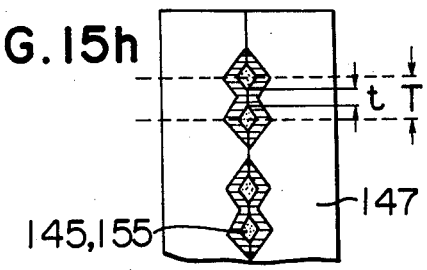
Figure 15I:
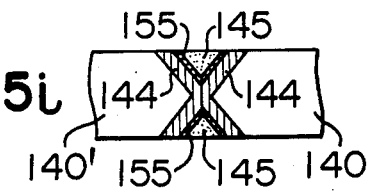

(VII) FIG. 15h shows the surface rubbing the magnetic tape of the jointed block 147 obtained in the process (g). In the process (h), as shown by dotted lines, the block is cut into divisions each of which has a predetermined core width T around the track width to produce a plurality of composite type magnetic heads. Sometimes the block is cut into divisions with the cutting line slanted by the atimuth angle. In this way, a narrow track composite type magnetic head core which has a surface rubbing the magnetic tape as illustrated in FIG. 15i is obtained. By winding a coil around the magnetic head core, a composite type magnetic head according to the present invention is obtained. In the method of the embodiment 11, a coil-winding groove 146 is formed after a magnetic metal film 144 has been deposited. In processing, burr may be caused on the edge of gap plane, deteriorating gap accuracy. The burr can be prevented by forming the coil-winding groove after completion of the process (a) and by executing only deposition of the gap forming film in the process (f).

Embodiment 12

Figure 16:
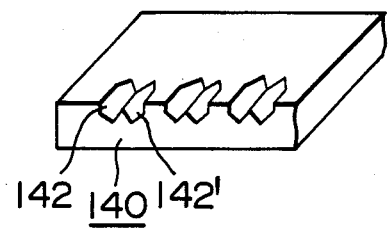
FIG. 16 is an oblique view of a ferrite block processed by still another embodiment of a composite type magnetic head manufacturing method according to the present invention.

FIG. 16 shows another embodiment of the present invention. In the process (a) of the embodiment illustrated in FIGS. 15a to 15i, grooves on the gap plane are formed up to the rear portion of the core (the side opposite to the surface facing the magnetic recording medium). It is possible to form grooves on a large block at a time and then divide it into small blocks. In this respect, therefore, the embodiment 11 is suitable to mass production. If the track width is narrow, however, the contact area of the rear portion of the core is small, resulting in an unfavorably high magnetic resistance value of the rear portion of the core. Even when track width matching is performed at the front portion (the side of the surface facing the magnetic recording medium), a matching error is caused at the rear portion. For a track width not exceeding 10 microns, there may scarcely remain any contact area at the magnetic substance portion. This problem is solved by forming cutting grooves 142 and 142' on the edge of the high permeability ferrite block 140 as illustrated in FIG. 16. Then the processes illustrated in FIGS. 15c to 15i yield the composite type magnetic head as illustrated in FIG. 9.

Embodiment 13

FIGS. 17a to 17d illustrate other embodiments of groove shapes and processing methods according to the present invention. FIG. 17a shows grooves 142 and 142' which have been processed by using a shaping cut-off blade having a V-shaped edge. If the groove angle θ is too large, the angle θ' of a projection 148 becomes large. When the formed magnetic metal film is ground to yield the track width t as illustrated in FIG. 15e, a large value of θ causes large variation in dimensions accuracy. If the angle θ is too small for a narrow track, the projection has mechanical weakness and may be broken during processing. Therefore, it is desirable to choose the value of the projection angle θ' in the range of 45° to 90°. Even if the projection angle 74 ' is outside this range, however, the magnetic head can be produced. Accordingly, the range of the projection angle does not limit the scope of the present invention. It is possible to make only the end of the projection 148 square-shaped. In this case, it is preferable that the end of the projection has no flat portions. This processing may be performed by means of mechanical processing or may be performed by processing corners as represented by a dotted line 149 using the reverse sputtering technique before depositing the magnetic metal film.

Figure 17D:
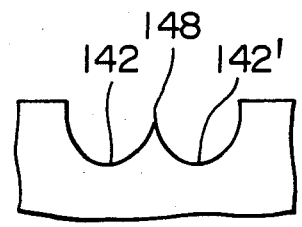

A projection can be formed at a time by using a double cut-off blade 150 as illustrated in FIG. 17c in groove processing. By using a multiwire saw as illustrated in FIG. 17d, a number of blocks can be processed simultaneously. In this case, the groove 142 is formed in V-shape. Laser processing or photoetching technique may also be used singly or in combination.

As heretofore described, the composite-type magnetic head according to the present invention has the following features.

(1) The eddy current loss can be reduced.
(2) The contour effect can be neglected.
(3) The contact area between the magnetic metal film and ferrite can be increased.
(4) Since one sheet of magnetic metal film is used doubly at the functional gap, the deposition time of the magnetic metal film can be reduced to half, facilitating mass production.
(5) It is not necessary to process the side of the magnetic metal film by using a cut-off blade in track width defining processing. As a result, there is no problem of chipping or burr in processed portion or peeling off of the film.
(6) When the magnetic metal film continues from the surface facing the magnetic recording medium to the rear portion of the core without being interrupted at the coil-winding window and then reaches the surface opposite the above described surface, the magnetic metal film itself constitutes a magnetic circuit loop, the recording/reproducing efficiency of the magnetic head being raised.

(7) Because of existence of the guard film on the magnetic metal film, reaction between the magnetic metal and non-magnetic material for filling is prevented. As a result, the magnetic characteristics of the magnetic metal substance is not deteriorated.

(8) In case where the magnetic film is deposited after groove processing for forming the coil-winding groove and groove processing for forming the ferrite projections, burr in the edge of the gap plane is not caused when processing the magnetic metal substance, the gap accuracy being assured.

The magnetic head according to the present invention has the above described advantages and can be easily produced.

Obviously many modifications and variations of the present invention are possible in the light of the above teachings. It is therefore to be understood that within the scope of the appended claims the invention may be practiced otherwise than as specifically described.

We claim:

1. A composite type magnetic head comprising:
   two high permeability ferrite blocks having projections projecting towards each other in a sectional view seen from a side of a surface facing a magnetic recording medium, said ferrite blocks at a front end of each of said projections having a width smaller than a track width of a recording track of the magnetic recording medium;
   magnetic substances deposited over at least both side faces of said projections of said ferrite blocks, each of said magnetic substances having a saturation flux density larger than that of said ferrite blocks, said magnetic substances confronting each other via a functinal gap near front ends of said projection;
   guard deposited over said magnetic substances around side faces of said projections of said ferrite blocks, said guard films comprising a non-magnetic material; and
   non-magnetic materials filled over said guard films up to a side face of a core formed by said ferrite blocks.

2. A composite type magnetic head according to claim 1, wherein the width of said projections becomes larger as the distance from said functional gap is increased.

3. A composite type magnetic head according to claim 2, wherein a functional gap plane is formed by said magnetic substances.

4. A composite type magnetic head according to claim 3, wherein the width of said ferrite at the front ends of said projections is not larger than half of the track width.

5. A composite type magnetic head according to claim 3, wherein the width of said ferrite at the front ends of said projections is nearly zero.

6. A composite type magnetic head according to claim 2, wherein the thickness of said magnetic substances is not larger than half of the track width.

7. A composite type magnetic head according to claim 5, wherein the thickness of said magnetic substances is nearly half of the track width.

8. A composite type magnetic head according to claim 2, wherein a functional gap forming surface is formed by said magnetic substance and said ferrite.

9. A composite type magnetic head according to claim 8, wherein the width of said magnetic substance of said functional gap plane in the track width direction is at least twice the width of said ferrite at the front end of said projection.

10. A composite type magnetic head according to claim 2, wherein said high permeability ferrite comprises Mn-Zn ferrite or Ni-Zn ferrite.

11. A composite type magnetic head according to claim 2, wherein said magnetic substance comprises a Fe-Si alloy, Fe-Al-Si alloy, Ni-Fe alloy, or a high permeability amorphous alloy.

12. A composite type magnetic head according to claim 2, wherein the front end of each of said ferrite projections has at least one indentation that is indented from an operation gap when seen from a side facing the magnetic recording medium.

13. A composite magnetic head according to claim 2, wherein a magnetic substance forms a loop around said coil-winding window.

* * * * *